(12) United States Patent
Prosperi et al.

(10) Patent No.: US 12,353,394 B2
(45) Date of Patent: Jul. 8, 2025

(54) USING A COMPLEX VALUE-BEARING LANGUAGE EXPRESSION TO GENERATE METADATA ASSOCIATED WITH AN ARTIFACT

(71) Applicant: Microsoft Technology Licensing, LLC, Redmond, WA (US)

(72) Inventors: Matteo Prosperi, Seattle, WA (US); Bertan Aygun, Issaquah, WA (US); Jason Malinowski, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/173,464

(22) Filed: Feb. 23, 2023

(65) Prior Publication Data
US 2024/0289317 A1 Aug. 29, 2024

(51) Int. Cl.
*G06F 16/23* (2019.01)
(52) U.S. Cl.
CPC .................................. *G06F 16/23* (2019.01)
(58) Field of Classification Search
CPC ...................................................... G06F 16/23
USPC ....................................................... 707/736
See application file for complete search history.

(56) References Cited

U.S. PATENT DOCUMENTS

| | | | |
|---|---|---|---|
| 9,229,693 B1 * | 1/2016 | Batni | G06F 8/30 |
| 11,392,486 B1 * | 7/2022 | Vadaparty | G06F 11/3688 |
| 2005/0021689 A1 | 1/2005 | Marvin | |
| 2008/0250313 A1 * | 10/2008 | Kamdar | G06F 9/451 |
| | | | 715/700 |
| 2012/0060148 A1 * | 3/2012 | Jones | G06F 8/51 |
| | | | 717/120 |
| 2017/0131983 A1 * | 5/2017 | Roytman | G06F 8/41 |
| 2018/0181620 A1 * | 6/2018 | Cohen | G06F 16/2455 |
| 2022/0366038 A1 * | 11/2022 | Summers | G06F 21/552 |
| 2022/0366042 A1 * | 11/2022 | Summers | G06F 21/565 |

(Continued)

OTHER PUBLICATIONS

"Enterprise Manager Cloud Control Extensibility Programmer's Reference", Retrieved From: https://docs.oracle.com/cd/E24628_01/doc.121/e25161/softwarelibrary.htm#EMPRF12863, Retrieved On: Dec. 5, 2022, 10 Pages.

(Continued)

*Primary Examiner* — Joshua Bullock
(74) *Attorney, Agent, or Firm* — Wade IP Law PLLC

(57) ABSTRACT

Techniques are described herein that are capable of using a complex value-bearing language expression to generate metadata associated with an artifact. The artifact is configured to define a type and to further define the complex value-bearing language expression. The artifact is built from source code. The type defines functionality of the artifact. The complex value-bearing language expression describes a configuration of the artifact or of a function of the artifact. The functionality and the configuration are defined in the source code, are written in a same computer language, and are included in a same software project. A constant value is extracted from the complex value-bearing language expression at build time of the artifact by evaluating a syntax of the complex value-bearing language expression. During a build of the artifact, the metadata is generated to include the constant value.

21 Claims, 7 Drawing Sheets

(56) References Cited

U.S. PATENT DOCUMENTS

2022/0366045 A1\* 11/2022 Summers .............. G06F 21/565
2023/0191821 A1\* 6/2023 Balasubramanian .. B42D 25/23
235/380

OTHER PUBLICATIONS

"Metadata in Java", Retrieved From: https://www.educba.com/metadata-in-java/, Retrieved On: Dec. 5, 2022, 12 Pages.
"VSExtensibility", Retrieved From: https://github.com/microsoft/VSExtensibility/, Retrieved On: Nov. 2, 2022, 4 Pages.
"Writing Your Own Extension", Retrieved From: https://quarkus.io/guides/writing-extensions, Retrieved On: Dec. 5, 2022, 71 Pages.
Warren, et al., "Metadata and Self-Describing Components", Retrieved From: https://learn.microsoft.com/en-us/dotnet/standard/metadata-and-self-describing-components, Nov. 3, 2022, 6 Pages.
International Search Report and Written Opinion received for PCT Application No. PCT/US2024/016065, May 27, 2024, 16 pages.

\* cited by examiner

```
public interface IFoo
{
  public abstract FooMetadata FooConfiguration { get; }
}
public class FooMetadata
{
  public FooMetadata(string name) { this.Name = name };
  public string Name { get; }
  public int? Count { get; init; } = null;
}
```

FIG. 5

```
[Command(
    "Command Description",
    placement: CommandPlacement.ToolsMenu)]

[CommandEnabledWhen(
    "SolutionLoaded & IsValidFile",
    new string[] { "SolutionLoaded", "IsValidFile" },
    new string[] { "SolutionState:Exists", @"ClientContext:Shell.ActiveSelectionFileName=\
.(jpg|jpeg|txt)$" })]

[CommandIcon("MyImage", IconSettings.IconAndText)]
internal class MyCommand : Command { ... }
```

FIG. 6

```
public class GetProcessIdCommand : Command
{
    public override CommandConfiguration CommandConfiguration => new("Command Description")
    {
        Placement = CommandPlacement.ToolsMenu, Icon = new(ImageMonikers.Custom("MyImage"), IconSettings.IconAndText),
        EnabledWhen = ActivationConstraint.SolutionState(SolutionState.Exists) &
            ActivationConstraint.ClientContext(ClientContextKey.Shell.ActiveEditorFileName, @"\.(jpg|jpeg|txt)$"),
    };
```

FIG. 7

```
public class MyFoo : IFoo
{
  private const int FooCount = 3;

// Configuration of the MyFoo functionality
  public FooMetadata FooConfiguration => new("My " + nameof(IFoo))
  {
    Count = Math.Max(0, FooCount) + 1,
  };

// Any funtionality of MyFoo goes here
}
```

FIG. 8

USING A COMPLEX VALUE-BEARING LANGUAGE EXPRESSION TO GENERATE METADATA ASSOCIATED WITH AN ARTIFACT

BACKGROUND

Metadata often is added to an artifact, such as a software library, to enable information about the artifact to be read without requiring the artifact to be loaded. For instance, enabling the information to be read without loading the artifact may be desirable if loading the artifact would negatively impact performance or security or if the artifact is not capable of being loaded. For example, the artifact may not be capable of being loaded if the artifact is built for a different platform or if a dependency of the artifact is missing.

In conventional metadata generation techniques, different computer languages and syntaxes typically are used to develop an artifact and to describe its metadata. The metadata is not part of the same project as the source code of the artifact, which results in the artifact and the metadata lacking coherency. Developers often do not know without reading documentation which properties are to be used as part of the metadata and which properties are capable of being used together.

The conventional techniques typically are capable of generating metadata using only simple language expressions. A simple language expression is a language expression that is a constant. Examples of a constant include but are not limited to a number (e.g., floating point number or integer) and a string. It will be recognized that determining a value of a complex (non-simple) language expression traditionally requires executing the language expression at runtime.

SUMMARY

It may be desirable to describe an artifact using a complex value-bearing language expression. An artifact is built from source code. Examples of an artifact include but are not limited to an executable file, a library (e.g., an extension to a computer program), and code deployed to the cloud. A complex value-bearing language expression is a value-bearing language expression that is not a constant. Examples of a complex value-bearing language expression include but are not limited to a property or field initializer, a getter method, and a value-returning parameterless method. A parameterless method is a method that takes no parameters. A value-bearing language expression is a language expression that produces or defines a value. A language expression is a portion of a computer program that is syntactically allowed by rules of a computer language in which the portion is written. For instance, the language expression may include one or more lexical tokens. A language expression may include any suitable language feature, including but not limited to a method invocation, a constructor invocation, an operator, a string concatenation, an object initializer, and a collection initializer. By using a complex value-bearing language expression to describe an artifact, a developer may be guided and required to correctly define a relatively complex configuration of the artifact.

Various approaches are described herein for, among other things, using a complex value-bearing language expression to generate metadata associated with an artifact. In an example approach, an artifact is configured to define a type and to further define a complex value-bearing language expression. The artifact is built from source code. The type defines functionality of the artifact. The complex value-bearing language expression describes a configuration of the artifact or of a function of the artifact. The functionality and the configuration are defined in the source code, are written in a same computer language, and are included in a same software project. A constant value is extracted from the complex value-bearing language expression at build time of the artifact by evaluating a syntax of the complex value-bearing language expression. During a build of the artifact, metadata that includes the constant value is generated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 5-8 depict example code snippets in accordance with embodiments.

Figure 1:
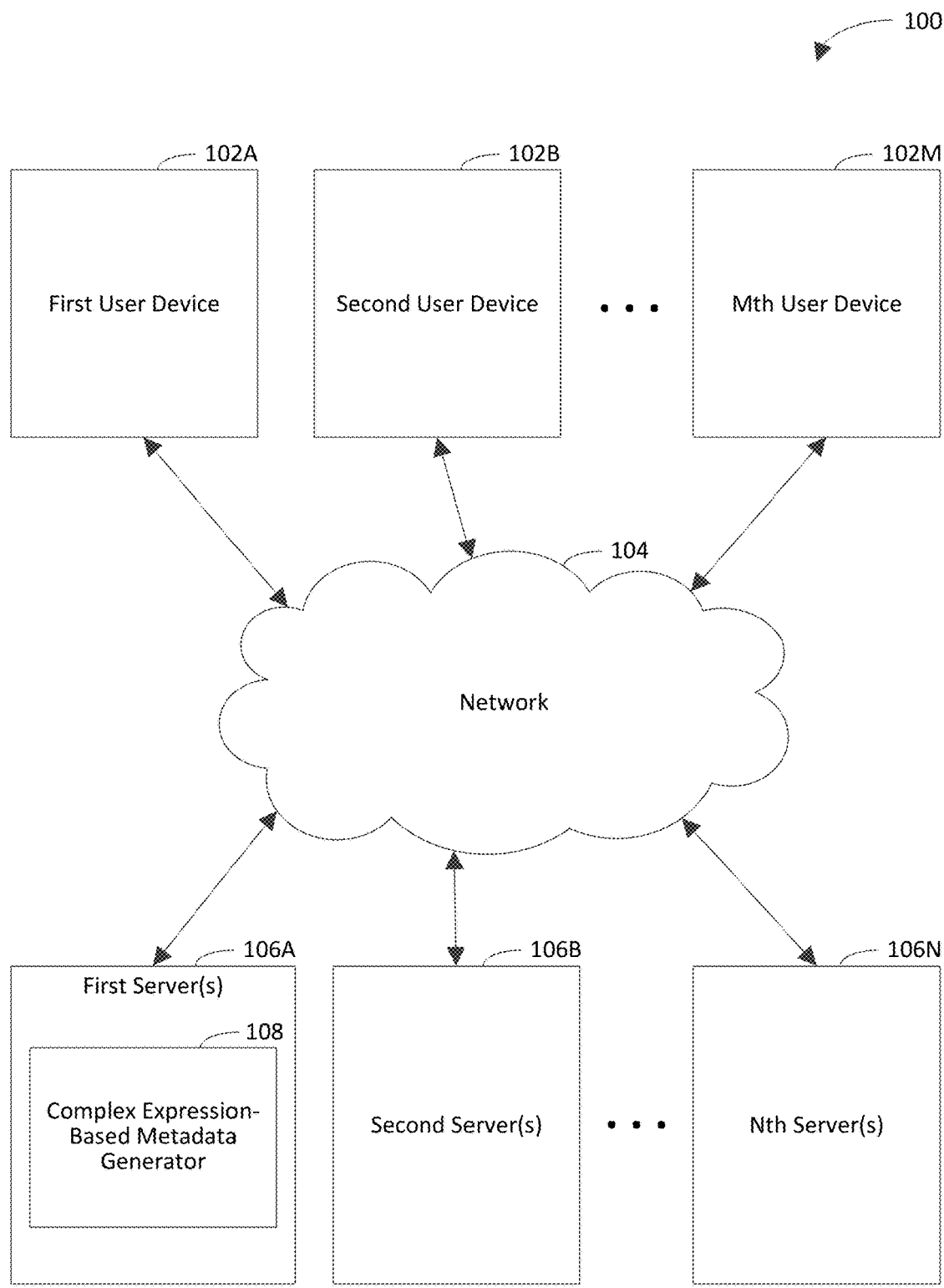
FIG. 1 is a block diagram of an example complex expression-based metadata generation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to describe an artifact using a complex value-bearing language expression. An artifact is built from source code. Examples of an artifact include but are not limited to an executable file, a library (e.g., an extension to a computer program), and code deployed to the cloud. A complex value-bearing language expression is a value-bearing language expression that is not a constant. Examples of a complex value-bearing language expression include but are not limited to a property or field initializer, a getter method, and a value-returning parameterless method. A parameterless method is a method that takes no parameters. A value-bearing language expression is a language expression that produces or defines a value. A language expression is a portion of a computer program that is syntactically allowed by rules of a computer language in which the portion is written. For instance, the language expression may include one or more lexical tokens. A language expression may include any suitable language feature, including but not limited to a method invocation, a constructor invocation, an operator, a string concatenation, an object initializer, and a collection initializer. By using a complex value-bearing language expression to describe an artifact, a developer may be guided and required to correctly define a relatively complex configuration of the artifact.

Example embodiments described herein are capable of using a complex value-bearing language expression to generate metadata associated with an artifact. In an aspect, the metadata describes cloud infrastructure that enables the artifact to run.

Example techniques described herein have a variety of benefits as compared to conventional techniques for generating metadata associated with an artifact. For instance, the example techniques enable developers to know which properties are to be used as part of the metadata and which properties are capable of being used together. The example techniques are capable of enforcing required properties using compilation errors. For example, the example techniques are capable of presenting errors in the metadata to a developer as compilation errors at build time and, when supported by the code editor, at editing time. The example techniques are capable of guiding a developer when assigning properties, especially when a code editor that allows code completion is used. For instance, the example techniques enable a developer to rely on type documentation and editor capabilities, including but not limited to tooltips and code autocompletion, as a guide when defining complex metadata. The example techniques are capable of confirming the validity of a regular expression and report any errors to the developer.

The example techniques enable a developer to use the same language capabilities and syntax to develop an artifact and to describe its metadata. The example techniques enable a developer to reference symbols from an artifact (e.g., using the C#operators "typeof" and "nameof"), rather than having to reference the symbols by name. For instance, referencing the symbols by name may be error-prone and may result in invalid metadata if the symbols are subsequently renamed. While NET attributes or similar features typically define metadata using primitive values (e.g., numbers, strings, or references to types) or arrays of primitive values, the example techniques enable a developer to define metadata using complex and expressive language features, including but not limited to constructors, factory methods, fluent application programming interfaces (APIs), method and property invocations, and overloaded operators.

The example techniques may enable metadata to describe a configuration of an artifact more accurately, precisely, and/or reliably than conventional techniques. For instance, by using a complex value-bearing language expression to generate the metadata, the example techniques may provide a more accurate, precise, and/or reliable description of the artifact.

The example techniques may reduce an amount of time and/or resources (e.g., processor cycles, memory, network bandwidth) that is consumed to execute a computer program. For instance, by using a complex value-bearing language expression to generate metadata that describes a configuration of an artifact in the computer program, the example techniques may be capable of describing the configuration to an extent that enables a computing system to delay or avoid loading the artifact. By reducing the amount of time and/or resources that is consumed by the computing system, the efficiency of the computing system may be increased and/or a cost associated with executing the computer program may be reduced.

A user experience of a developer who develops a computer program may be increased, for example, by enabling the developer (1) to use the same language capabilities and syntax to develop artifacts and to describe their configurations, (2) to know which properties are available to be used in the metadata and which properties are required, (3) to define metadata using complex and expressive language features, and (4) to rely on type documentation and editor capabilities as a guide when defining complex metadata.

FIG. 1 is a block diagram of an example complex expression-based metadata generation system 100 in accordance with an embodiment. Generally speaking, the complex expression-based metadata generation system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the complex expression-based metadata generation system 100 uses a complex value-bearing language expression to generate metadata associated with an artifact. Detail regarding techniques for using a complex value-bearing language expression to generate metadata associated with an artifact is provided in the following discussion.

As shown in FIG. 1, the complex expression-based metadata generation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the complex expression-based metadata generation system 100.

One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; App-Code® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force.com® platform developed and distributed by Salesforce, Inc. It will be recognized that the example techniques described herein may be implemented using a developer tool.

Another example type of a computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include complex expression-based metadata generator 108 for illustrative purposes. The complex expression-based metadata generator 108 is configured to use a complex value-bearing language expression to generate metadata associated with an artifact. The complex expression-based metadata generator 108 configures an artifact to define a type and to further define a complex value-bearing language expression. The artifact is built from source code. The type defines functionality of the artifact. The complex value-bearing language expression describes a configuration of the artifact or of a function of the artifact. The functionality and the configuration are defined in the source code, are written in a same computer language, and are included in a same software project. The complex expression-based metadata generator 108 extracts a constant value from the complex value-bearing language expression at build time of the artifact by evaluating a syntax of the complex value-bearing language expression. During a build of the artifact, the complex expression-based metadata generator 108 generates metadata that includes the constant value.

The complex expression-based metadata generator 108 may be implemented in various ways to use a complex value-bearing language expression to generate metadata associated with an artifact, including being implemented in hardware, software, firmware, or any combination thereof. For example, the complex expression-based metadata generator 108 may be implemented as computer program code configured to be executed in one or more processors. In another example, at least a portion of the complex expression-based metadata generator 108 may be implemented as hardware logic/electrical circuitry. For instance, at least a portion of the complex expression-based metadata generator 108 may be implemented in a field-programmable gate array (FPGA), an application-specific integrated circuit (ASIC), an application-specific standard product (ASSP), a systemon-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the complex expression-based metadata generator 108 may be (or may be included in) a developer tool and/or a cloud computing program, though the scope of the example embodiments is not limited in this respect.

The complex expression-based metadata generator 108 is shown to be incorporated in the first server(s) 106A for illustrative purposes and is not intended to be limiting. It will be recognized that the complex expression-based metadata generator 108 (or any portion(s) thereof) may be incorporated in any one or more of the servers 106A-106N, any one or more of the user devices 102A-102M, or any combination thereof. For example, client-side aspects of the complex expression-based metadata generator 108 may be incorporated in one or more of the user devices 102A-102M, and server-side aspects of complex expression-based metadata generator 108 may be incorporated in one or more of the servers 106A-106N.

Figure 2:
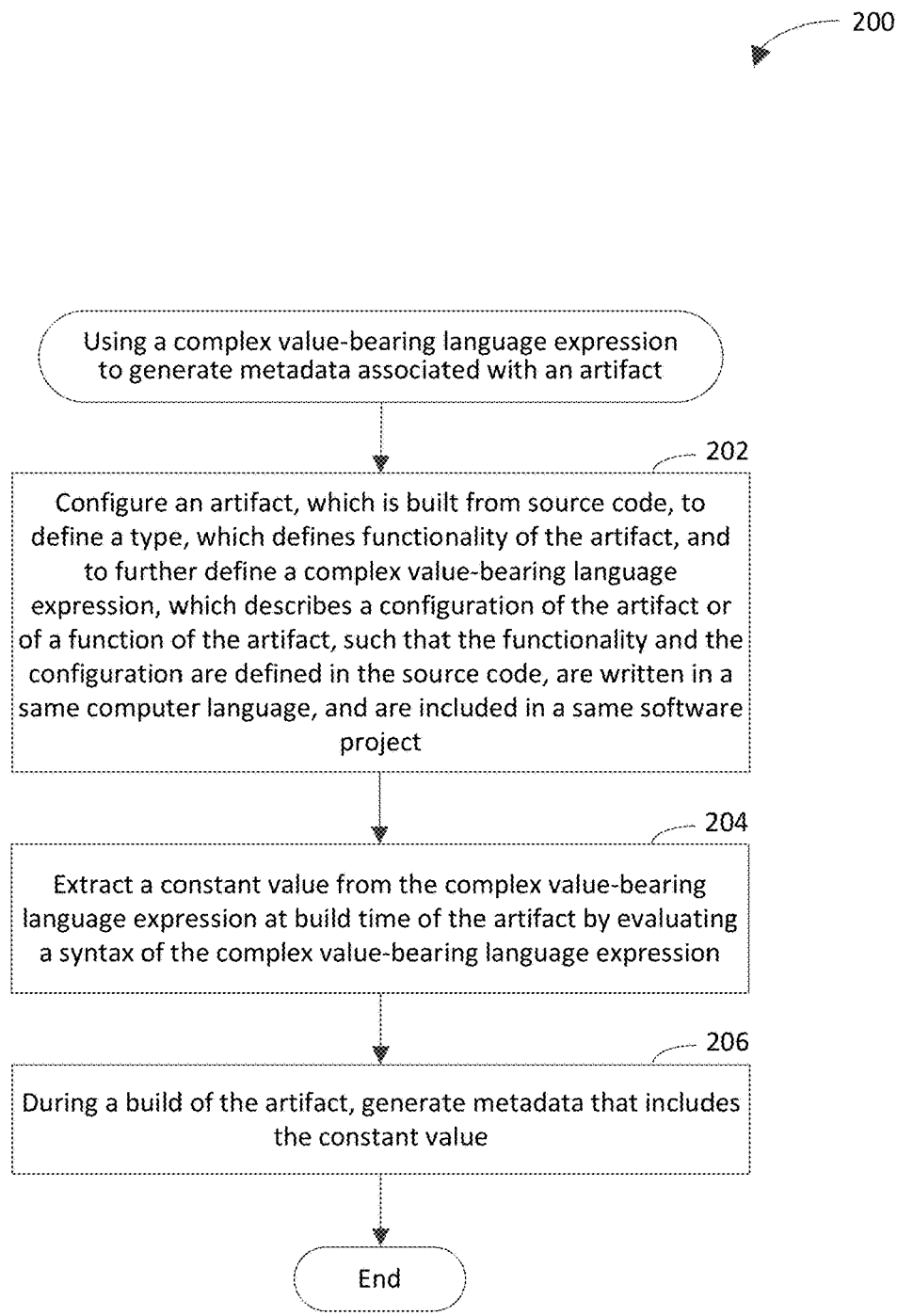
FIGS. 2-3 depict flowcharts of example methods for using a complex value-bearing language expression to generate metadata associated with an artifact in accordance with embodiments.
Figure 3:
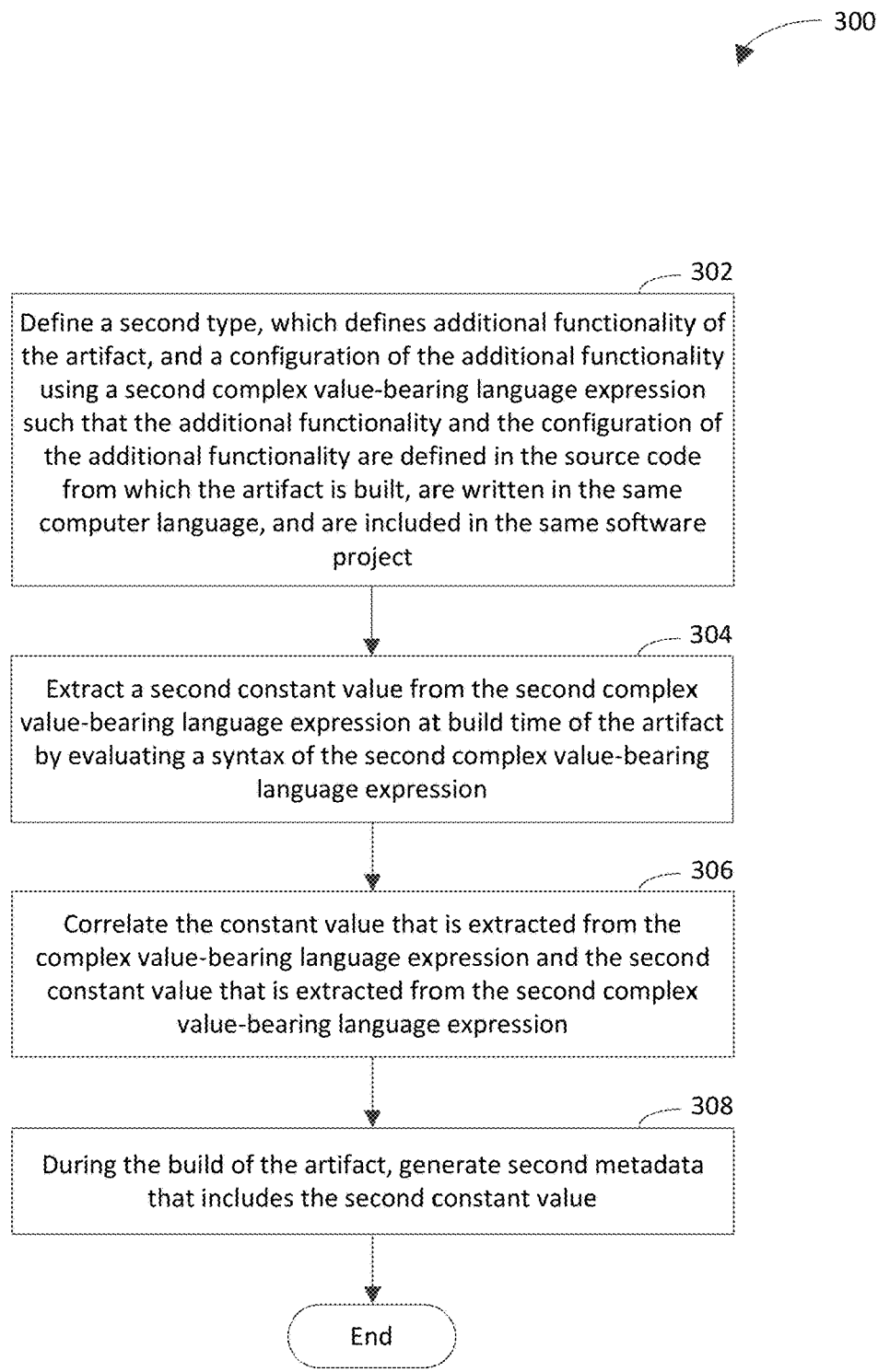
Figure 4:
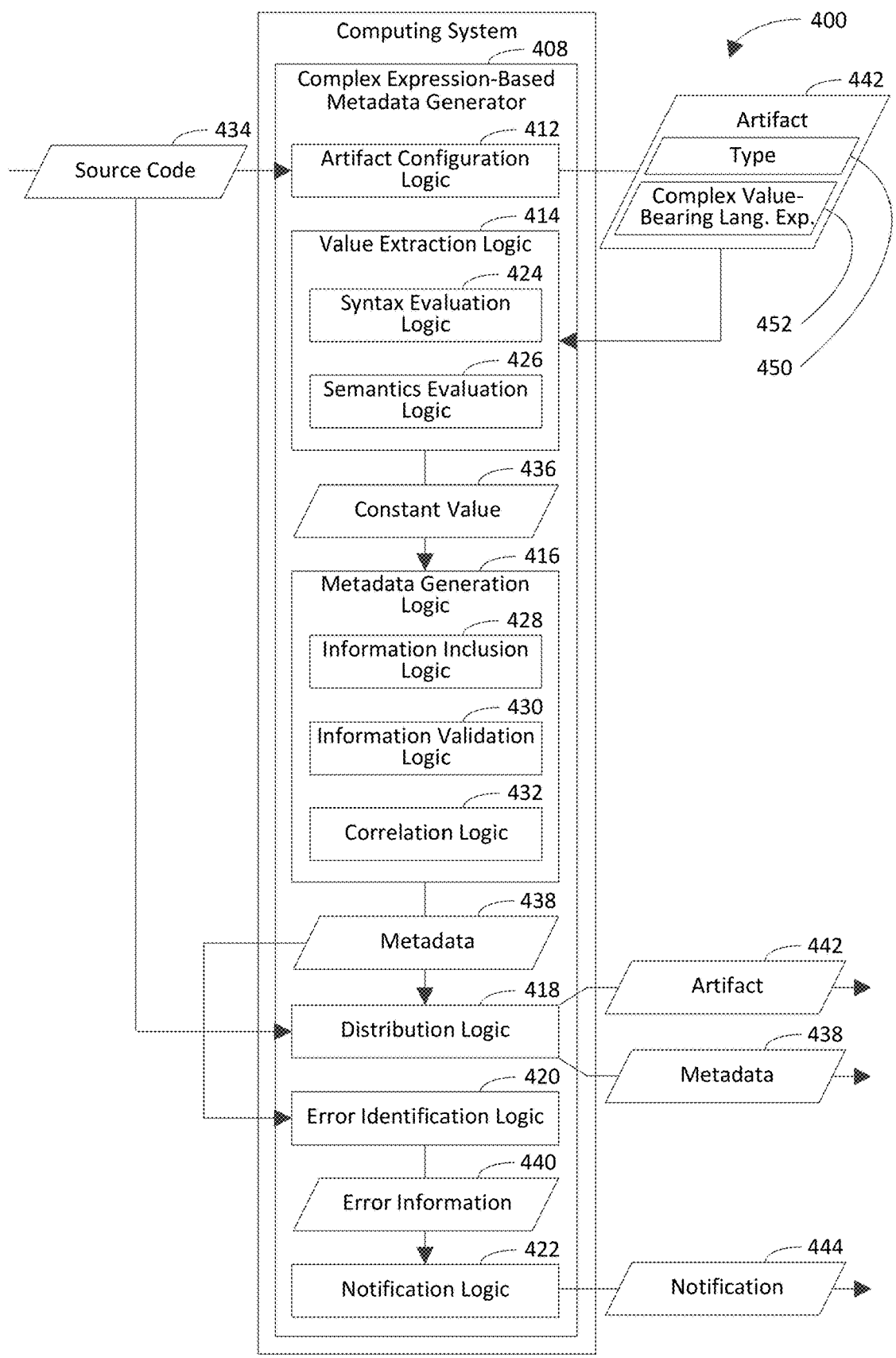
FIG. 4 is a block diagram of an example computing system in accordance with an embodiment.

FIGS. 2-3 depict flowcharts 200 and 300 of example methods for using a complex value-bearing language expression to generate metadata associated with an artifact in accordance with embodiments. Flowcharts 200 and 300 may be performed by the first server(s) 106A shown in FIG. 1, for example. For illustrative purposes, flowcharts 200 and 300 are described with respect to computing system 400 shown in FIG. 4, which is an example implementation of the first server(s) 106A. As shown in FIG. 4, the computing system 400 includes a complex expression-based metadata generator 408. The complex expression-based metadata generator 408 includes artifact configuration logic 412, value extraction logic 414, metadata generation logic 416, distribution logic 418, error identification logic 420, and notification logic 422. The value extraction logic 414 includes syntax evaluation logic 424 and semantic evaluation logic 426. The metadata generation logic 416 includes information inclusion logic 428, information validation logic 430, and correlation logic 432. Further structural and operational embodiments will be apparent to persons skilled in the relevant art(s) based on the discussion regarding flowcharts 200 and 300.

As shown in FIG. 2, the method of flowchart 200 begins at step 202. In step 202, an artifact is configured to define a type and to further define a complex value-bearing language expression. The complex value-bearing language expression may be defined as part of the type, though the example embodiments are not limited in this respect. The artifact is built from source code. The type defines functionality of the artifact. In an aspect, the functionality indicates which code is executed when the type is executed. In another aspect, the functionality is defined by properties. A property may be a virtual property or an abstract property. A virtual property is a property need not necessarily be implemented when the type is implemented. An abstract property is a property that must be implemented when the type is implemented. In yet another aspect, the type is a NET type. Examples of a type include but are not limited to a command, a tool window, a document type, and a listener. For example, the document type may define a .txt file as a file that includes text and may indicate functionalities that are enabled for the document type. In another example, the listener may listen to events that are generated when a user opens, closes, or edits a document (e.g., a file) of a specified document type. The complex value-bearing language expression describes a configuration of the artifact or of a function of the artifact. The functionality and the configuration are defined in the source code, are written in a same computer language, and are included in a same software project. For example, the computer language in which the functionality and the configuration are written may be a domain-specific computer language. A domain-specific computer language is a computer language that is specialized to a particular application domain. For instance, the domain-specific computer language may be optimized for a specific class of problems.

In an example implementation, the artifact configuration logic 412 configures an artifact 442 to define a type 450 and to further define a complex value-bearing language expression 452. The artifact 442 is built from source code 434. The type 450 defines functionality of the artifact 442. The complex value-bearing language expression 452 describes a configuration of the artifact 442 or of a function of the artifact 442. The functionality and the configuration are defined in the source code 434, are written in the same computer language, and are included in the same software project.

In an example embodiment, the complex value-bearing language expression references the type, which defines the functionality of the artifact.

In another example embodiment, the type, which defines functionality of the artifact, references the complex value-bearing language expression.

At step 204, a constant value is extracted from the complex value-bearing language expression at build time of the artifact by evaluating a syntax of the complex value-bearing language expression. For example, the constant value may be extracted by a compiler, a separate script, an application, or a tool to parse the source code just before or after build time of the artifact. Build time of the artifact is a time at which the artifact is built from the source code. In an aspect, the build time of the artifact constitutes a compile time of the artifact. For instance, the build time may constitute the compile time for compiled computer languages, such as C#. Compile time of the artifact is a time at which the artifact is compiled. It will be recognized that some computer languages, such as Perl and JavaScript, are not compiled. The syntax of the complex value-bearing language expression represents the structure of the complex value-bearing language expression, wherein semantics of the complex value-bearing language expression represent the meaning of the complex value-bearing language expression.

In an example implementation, the value extraction logic 414 extracts a constant value 436 from the complex value-bearing language expression 452 at build time of the artifact 442 by evaluating a syntax of the complex value-bearing language expression 452. In accordance with this implementation, the syntax evaluation logic 424 evaluates the syntax of the complex value-bearing language expression 452.

In an example embodiment, extracting the constant value from the complex value-bearing language expression at step 204 includes evaluating the syntax of the complex value-bearing language expression and semantics of the complex value-bearing language expression. In an example, implementation, the syntax evaluation logic 424 evaluates the syntax of the complex value-bearing language expression 452, and the semantics evaluation logic 426 evaluates the semantics of the complex value-bearing language expression 452.

At step 206, during a build of the artifact, metadata that includes the constant value is generated. In an aspect, the metadata describes the cloud infrastructure that enables the artifact to run. In an example implementation, the metadata generation logic 416 generates metadata 438 that includes the constant value 436 during a build of the artifact 442.

In an example embodiment, the metadata describes a manner in which the artifact is to be loaded. In an aspect of this embodiment, the artifact requires a host executable. In accordance with this aspect, the metadata may indicate a type of host executable is capable of loading the artifact. In further accordance with this aspect, the metadata may indicate the configuration of the artifact to enable the artifact to be loaded correctly.

In another example embodiment, the metadata indicates an operation that is to trigger loading of the artifact. In an aspect of this embodiment, the artifact defines a command. An example in which an artifact defines a command is described in further detail below with reference to FIG. 7. In accordance with this aspect, the metadata may indicate that loading of the artifact (e.g., and running of functionality defined by the artifact) is to be triggered by selection of a designated user interface element. In further accordance with this aspect, the metadata may further indicate that the designated user interface is to be displayed (e.g., in a specified menu, in a specified position in a user interface, or having a specified name) to enable selection of the designated user interface.

In yet another example embodiment, the metadata describes a configuration of a resource on which the artifact depends. For instance, the resource may be a cloud resource. A cloud resource is a resource that is hosted in the cloud.

In still another example embodiment, generating the metadata at step 206 includes ensuring that the metadata includes requisite information. For instance, the requisite information may be a parameter or a property. In an example implementation, the information inclusion logic 428 ensures that the metadata includes the requisite information. In accordance with this embodiment, generating the metadata at step 206 further includes ensuring validity of the requisite information. In an example implementation, the information validation logic 430 ensures the validity of the requisite information.

In an aspect of this embodiment, ensuring that the metadata includes the requisite information includes causing a base type or an interface implemented by the type, which defines the functionality of the artifact, to require implementation of a requisite configuration, which is described by a complex value-bearing language expression of a specific data type, by leveraging a type system of the same computer language. In an example of this aspect, ensuring the validity of the requisite information includes causing the specific data type of the complex value-bearing language expression to ensure the validity of the requisite information by leveraging the type system of the same computer language.

In another aspect of this embodiment, ensuring the validity of the requisite information includes determining that the requisite information includes invalid information; notifying a developer of the source code about the invalid information; and replacing the invalid information with valid information in the metadata. For instance, the valid information may be received from the developer in response to notifying the developer about the invalid information.

In another example embodiment, the complex value-bearing language expression describes the configuration of the function of the artifact. In accordance with this embodiment, the function and the metadata are included in a same source code file. In an aspect of this embodiment, the artifact is configured to require implementation of the metadata.

In yet another example embodiment, the complex value-bearing language expression describes the configuration of the function of the artifact. In accordance with this embodiment, the function is included in a first source code file of the same software project, and the metadata is included in a second sourced code file of the same software project. The second source code file is different from the first source code file. For instance, the second source code file may be a C#file, a C++ file, or a Java file.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes identifying an error in the metadata. For example, the error may result from the complex value-bearing language expression violating a rule that applies to the complex value-bearing language expression. In accordance with this example, the rule may indicate that the complex value-bearing language expression cannot include multi-statement imperative code or that the complex value-bearing language expression cannot include an if-else statement. In an example implementation, the error identification logic 420 identifies the error in the metadata 438. In accordance with this implementation, the error identification logic 420 generates error information 440 to indicate (e.g., specify) the error. In accordance with this embodiment, the method of flowchart 200 further includes reporting the error to a developer of the source code while the developer is editing the complex value-bearing language expression. For example, reporting the error may include indicating a portion of the complex value-bearing language expression that causes the error (e.g., using red squiggles). In an example implementation, the notification logic 422 reports the error to the developer of the source code 434 while the developer is editing the complex value-bearing language expression 452. In an aspect of this implementation, the notification logic 422 generates a notification 444, indicating the error, based on the error information 440. In accordance with this aspect, the notification logic 422 provides the notification 444 to the developer while the developer is editing the complex value-bearing language expression 452.

In another example embodiment, the method of flowchart 200 further includes providing a textual message to a developer of the source code. In an example implementation, the notification logic 422 provides a notification 444, which includes the textual message, to a developer of the source code 434. In a first aspect of this embodiment, the textual message indicates that execution of the artifact necessitates implementation of the complex value-bearing language expression. In an example implementation, the textual message indicates that execution of the artifact 442 necessitates implementation of the complex value-bearing language expression 452. In a second aspect of this embodiment, the textual message indicates that the complex value-bearing language expression is to be evaluated at build time of the artifact. In an example implementation, the textual message indicates that the complex value-bearing language expression 452 is to be evaluated at build time of the artifact 442.

In yet another example embodiment, the artifact and the metadata are distributed to a user of the artifact. In an example implementation, the distribution logic 418 distributes the artifact 442 and the metadata 438 to the user of the artifact 442.

In still another example embodiment, the method of flowchart 200 further includes one or more of the steps shown in flowchart 300 of FIG. 3. As shown in FIG. 3, the method of flowchart 300 begins at step 302. In step 302, a second type, which defines additional functionality of the artifact, and a configuration of the additional functionality are defined using a second complex value-bearing language expression such that the additional functionality and the configuration of the additional functionality are defined in the source code from which the artifact is built, are written in the same computer language, and are included in the same software project. In an example implementation, the artifact configuration logic 412 defines the second type, which defines additional functionality of the artifact 442, and the configuration of the additional functionality using the second complex value-bearing language expression such that the additional functionality and the configuration of the additional functionality are defined in the source code 434 from which the artifact 442 is built, are written in the same computer language, and are included in the same software project.

At step 304, a second constant value is extracted from the second complex value-bearing language expression at build time of the artifact by evaluating a syntax of the second complex value-bearing language expression. In an example implementation, the value extraction logic 414 extracts the second constant value from the second complex value-bearing language expression at build time of the artifact 442 by evaluating a syntax of the second complex value-bearing language expression. For instance, the syntax evaluation logic 424 may evaluate the syntax of the second complex value-bearing language expression.

In an example embodiment, extracting the second constant value at step 304 includes evaluating the syntax and semantics of the second complex value-bearing language expression. For example, the syntax evaluation logic 424 may evaluate the syntax of the second complex value-bearing language expression, and the semantics evaluation logic 426 may evaluate the semantics of the second complex value-bearing language expression.

At step 306, the constant value that is extracted from the complex value-bearing language expression and the second constant value that is extracted from the second complex value-bearing language expression are correlated. In an example implementation, the correlation logic 432 correlates the constant value 436 that is extracted from the complex value-bearing language expression 452 and the second constant value that is extracted from the second complex value-bearing language expression.

At step 308, during the build of the artifact, second metadata that includes the second constant value is generated. In an example implementation, during the build of the artifact 442, the metadata generation logic 416 generates the second metadata to include the second constant value.

In an aspect of this embodiment, the complex value-bearing language expression references the second complex value-bearing language expression.

In another aspect of this embodiment, the second complex value-bearing language expression references the complex value-bearing language expression.

It will be recognized that the computing system 400 may not include one or more of the complex expression-based metadata generator 408, the artifact configuration logic 412, the value extraction logic 414, the metadata generation logic 416, the distribution logic 418, the error identification logic 420, the notification logic 422, the syntax evaluation logic 424, the semantic evaluation logic 426, the information inclusion logic 428, the information validation logic 430, and/or the correlation logic 432. Furthermore, the computing system 400 may include components in addition to or in lieu of the complex expression-based metadata generator 408, the artifact configuration logic 412, the value extraction logic 414, the metadata generation logic 416, the distribution logic 418, the error identification logic 420, the notification logic 422, the syntax evaluation logic 424, the semantic evaluation logic 426, the information inclusion logic 428, the information validation logic 430, and/or the correlation logic 432.

An example implementation will now be described with reference to FIGS. 5-8, which depict example code snippets 500, 600, 700, and 800 in accordance with embodiments. In accordance with this implementation, it may be desirable to configure .NET libraries that implement a "IFoo" interface to have a required metadata "Name," which is a string, and an optional metadata "Count," which is an integer. This may be achieved by defining "IFoo" using the code snippet 500 shown in FIG. 5.

As indicated in the code snippet 500, a developer who implements "IFoo" is forced by the abstract property to describe its metadata. The constructor forces the definition of the "Name," and the "Count" is optional. At editing time, the validity of the metadata configuration is intuitively enforced by the rules of the C#language and the NET type system. An analyzer (e.g., a Roslyn analyzer) may enforce additional rules (e.g., a specific string format for the "Name" or value boundaries on the "Count"), and a violation may be presented to the developer as an actionable diagnostic message. When the developer compiles the code snippet 500, which includes the implementation of the "IFoo" interface, a code generator (e.g., a Roslyn code generator) reads the syntax and semantic information associated with the "FooConfiguration" property, applies any validation rules, and converts them into library metadata. For instance, the library metadata may be distributed as a JSON file or an XML file alongside the library.

Class-related metadata may be described using attributes. Code snippet 600 of FIG. 6 illustrates how the configuration of a new menu item that is being added to a code editor may be described. Code snippet 700 of FIG. 7 illustrates how the configuration may be expressed as a complex value-bearing language expression. Referring to code snippet 700, the NET type system guides the developer when assigning the "EnabledWhen" property. This experience is further improved when using an editor in which code completion is available. The "icon" configuration contains a first parameter that can be one of the known monikers or a custom value. Due to limitations in the capabilities of NET attributes, this parameter is typed as a string to accommodate custom values, which may make it difficult for the developer to discover the list of known monikers. In accordance with this implementation, the parameter is typed as an "ImageMonikers," which provides access to the list of known monikers (e.g., as static properties) and which provides a way to specify a custom value (e.g., as a factory method), making both relatively easy to discover. Code snippet 800 of FIG. 8 illustrates another example of how a configuration may be expressed as a complex value-bearing language expression.

This implementation may require the complex value-bearing language expression to have a constant value at the time of compilation and to be expressed as a single operation tree. During a recursive exploration, the expression tree may be evaluated depth-first with leaves being evaluated first. Each operation may be executed using reflection until the entire value of the complex value-bearing language expression is evaluated. This implementation may require the code generator to have access to the same types as the code being analyzed, as well as generic types (e.g., strings, numbers, and arrays) that may be used in the expression. Because the code generator relies on being able to reference the same types (or equivalent types with matching identity), the code generator may be extended relatively easily to support new types with many properties or complex validation logic. It will be recognized that the code snippets 500, 600, 700, and 800, which are described with regard to this implementation, are provided for illustrative purposes and are not intended to be limiting.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the complex expression-based metadata generator 108, the complex expression-based metadata generator 408, the artifact configuration logic 412, the value extraction logic 414, the metadata generation logic 416, the distribution logic 418, the error identification logic 420, the notification logic 422, the syntax evaluation logic 424, the semantic evaluation logic 426, the information inclusion logic 428, the information validation logic 430, the correlation logic 432, flowchart 200, and/or flowchart 300 may be implemented in hardware, software, firmware, or any combination thereof.

For example, any one or more of the complex expression-based metadata generator 108, the complex expression-based metadata generator 408, the artifact configuration logic 412, the value extraction logic 414, the metadata generation logic 416, the distribution logic 418, the error identification logic 420, the notification logic 422, the syntax evaluation logic 424, the semantic evaluation logic 426, the information inclusion logic 428, the information validation logic 430, the correlation logic 432, flowchart 200, and/or flowchart 300 may be implemented, at least in part, as computer program code configured to be executed in one or more processors.

In another example, any one or more of the complex expression-based metadata generator 108, the complex expression-based metadata generator 408, the artifact configuration logic 412, the value extraction logic 414, the metadata generation logic 416, the distribution logic 418, the error identification logic 420, the notification logic 422, the syntax evaluation logic 424, the semantic evaluation logic 426, the information inclusion logic 428, the information validation logic 430, the correlation logic 432, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

II. Further Discussion of Some Example Embodiments (A1) An example system (FIG. 1, 102A-102M, 106A-106N; FIG. 4, 400; FIG. 8, 800) comprises memory (FIG. 8, 804, 808, 810) and a processing system (FIG. 8, 802) coupled to the memory. The processing system is configured to configure (FIG. 2, 202) an artifact (FIG. 4, 442), which is built from source code (FIG. 4, 434), to define a type (FIG. 4, 450), which defines functionality of the artifact, and to further define a complex value-bearing language expression (FIG. 4, 452), which describes a configuration of the artifact or of a function of the artifact, such that the functionality and the configuration are defined in the source code, are written in a same computer language, and are included in a same software project. The processing system is further configured to extract (FIG. 2, 204) a constant value (FIG. 4, 436) from the complex value-bearing language expression at build time of the artifact by evaluating a syntax of the complex value-bearing language expression. The processing system is further configured to, during a build of the artifact, generate (FIG. 2, 206) metadata (FIG. 4, 438) that includes the constant value.

(A2) In the example system of A1, wherein the complex value-bearing language expression is defined as part of the type, which defines the functionality of the artifact.

(A3) In the example system of any of A1-A2, wherein the processing system is configured to: extract the constant value from the complex value-bearing language expression at build time of the artifact by evaluating the syntax of the complex value-bearing language expression and semantics of the complex value-bearing language expression.

(A4) In the example system of any of A1-A3, wherein the complex value-bearing language expression describes the configuration of the function of the artifact; and wherein the function and the metadata are included in a same source code file.

(A5) In the example system of any of A1-A4, wherein the complex value-bearing language expression describes the configuration of the function of the artifact; wherein the function is included in a first source code file of the same software project, and wherein the metadata is included in a second sourced code file of the same software project; and wherein the second source code file is different from the first source code file.

(A6) In the example system of any of A1-A5, wherein the metadata describes a manner in which the artifact is to be loaded.

(A7) In the example system of any of A1-A6, wherein the metadata indicates an operation that is to trigger loading of the artifact.

(A8) In the example system of any of A1-A7, wherein the metadata describes a configuration of a resource on which the artifact depends.

(A9) In the example system of any of A1-A8, wherein the processing system is further configured to: identify an error in the metadata; and report the error to a developer of the source code while the developer is editing the complex value-bearing language expression.

(A10) In the example system of any of A1-A9, wherein the processing system is further configured to: provide a textual message to a developer of the source code, the textual message indicating that execution of the artifact necessitates implementation of the complex value-bearing language expression.

(A11) In the example system of any of A1-A10, wherein the processing system is further configured to: provide a textual message to a developer of the source code, the textual message indicating that the complex value-bearing language expression is to be evaluated at build time of the artifact.

(A12) In the example system of any of A1-A11, wherein the processing system is configured to: ensure that the metadata includes requisite information; and ensure validity of the requisite information.

(A13) In the example system of any of A1-A12, wherein the processing system is configured to: ensure that the metadata includes the requisite information by causing a base type or an interface implemented by the type, which defines the functionality of the artifact, to require implementation of a requisite configuration, which is described by a complex value-bearing language expression of a specific data type, by leveraging a type system of the same computer language.

(A14) In the example system of any of A1-A13, wherein the processing system is configured to: cause the specific data type of the complex value-bearing language expression to ensure the validity of the requisite information by leveraging the type system of the same computer language.

(A15) In the example system of any of A1-A14, wherein the complex value-bearing language expression references the type, which defines the functionality of the artifact.

(A16) In the example system of any of A1-A15, wherein the type, which defines functionality of the artifact, references the complex value-bearing language expression.

(A17) In the example system of any of A1-A16, wherein the processing system is further configured to: define a second type, which defines additional functionality of the artifact, and a configuration of the additional functionality using a second complex value-bearing language expression such that the additional functionality and the configuration of the additional functionality are defined in the source code from which the artifact is built, are written in the same computer language, and are included in the same software project; extract a second constant value from the second complex value-bearing language expression at build time of the artifact by evaluating a syntax of the second complex value-bearing language expression; and during the build of the artifact, generate second metadata that includes the second constant value.

(A18) In the example system of any of A1-A17, wherein the processing system is further configured to: correlate the constant value that is extracted from the complex value-bearing language expression and the second constant value that is extracted from the second complex value-bearing language expression.

(A19) In the example system of any of A1-A18, wherein the complex value-bearing language expression references the second complex value-bearing language expression.

(A20) In the example system of any of A1-A19, wherein the second complex value-bearing language expression references the complex value-bearing language expression.

(B1) An example method is implemented by a computing system (FIG. 1, 102A-102M, 106A-106N; FIG. 4, 400; FIG. 8, 800). The method comprises configuring (FIG. 2, 202) an artifact (FIG. 4, 442), which is built from source code (FIG. 4, 434), to define a type (FIG. 4, 450), which defines functionality of the artifact, and to further define a complex value-bearing language expression (FIG. 4, 452), which describes a configuration of the artifact or of a function of the artifact, such that the functionality and the configuration are defined in the source code, are written in a same computer language, and are included in a same software project. The method further comprises extracting a (FIG. 2, 204) constant value (FIG. 4, 436) from the complex value-bearing language expression at build time of the artifact by evaluating a syntax of the complex value-bearing language expression. The method further comprises, during a build of the artifact, generating (FIG. 2, 206) metadata (FIG. 4, 438) that includes the constant value.

(B2) In the method of B1, wherein the complex value-bearing language expression is defined as part of the type, which defines the functionality of the artifact.

(B3) In the method of any of B1-B2, wherein extracting the constant value from the complex value-bearing language expression comprises: evaluating the syntax of the complex value-bearing language expression and semantics of the complex value-bearing language expression.

(B4) In the method of any of B1-B3, wherein the complex value-bearing language expression describes the configuration of the function of the artifact; and wherein the function and the metadata are included in a same source code file.

(B5) In the method of any of B1-B4, wherein the complex value-bearing language expression describes the configuration of the function of the artifact; wherein the function is included in a first source code file of the same software project, and wherein the metadata is included in a second sourced code file of the same software project; and wherein the second source code file is different from the first source code file.

(B6) In the method of any of B1-B5, wherein the metadata describes a manner in which the artifact is to be loaded.

(B7) In the method of any of B1-B6, wherein the metadata indicates an operation that is to trigger loading of the artifact.

(B8) In the method of any of B1-B7, wherein the metadata describes a configuration of a resource on which the artifact depends.

(B9) In the method of any of B1-B8, further comprising: identifying an error in the metadata; and reporting the error to a developer of the source code while the developer is editing the complex value-bearing language expression.

(B10) In the method of any of B1-B9, further comprising: providing a textual message to a developer of the source code, the textual message indicating that execution of the artifact necessitates implementation of the complex value-bearing language expression.

(B11) In the method of any of B1-B10, further comprising: providing a textual message to a developer of the source code, the textual message indicating that the complex value-bearing language expression is to be evaluated at build time of the artifact.

(B12) In the method of any of B1-B11, wherein generating the metadata comprises: ensuring that the metadata includes requisite information; and ensuring validity of the requisite information.

(B13) In the method of any of B1-B12, wherein ensuring that the metadata includes the requisite information comprises: causing a base type or an interface implemented by the type, which defines the functionality of the artifact, to require implementation of a requisite configuration, which is described by a complex value-bearing language expression of a specific data type, by leveraging a type system of the same computer language.

(B14) In the method of any of B1-B13, wherein ensuring the validity of the requisite information comprises: causing the specific data type of the complex value-bearing language expression to ensure the validity of the requisite information by leveraging the type system of the same computer language.

(B15) In the method of any of B1-B14, wherein the complex value-bearing language expression references the type, which defines the functionality of the artifact.

(B16) In the method of any of B1-B15, wherein the type, which defines functionality of the artifact, references the complex value-bearing language expression.

(B17) In the method of any of B1-B16, further comprising: defining a second type, which defines additional functionality of the artifact, and a configuration of the additional functionality using a second complex value-bearing language expression such that the additional functionality and the configuration of the additional functionality are defined in the source code from which the artifact is built, are written in the same computer language, and are included in the same software project; extracting a second constant value from the second complex value-bearing language expression at build time of the artifact by evaluating a syntax of the second complex value-bearing language expression; and during the build of the artifact, generating second metadata that includes the second constant value.

(B18) In the method of any of B1-B17, further comprising: correlating the constant value that is extracted from the complex value-bearing language expression and the second constant value that is extracted from the second complex value-bearing language expression.

(B19) In the method of any of B1-B18, wherein the complex value-bearing language expression references the second complex value-bearing language expression.

(B20) In the method of any of B1-B19, wherein the second complex value-bearing language expression references the complex value-bearing language expression.

(C1) An example computer program product (FIG. 8, 818, 822) comprising a computer-readable storage medium having instructions recorded thereon for enabling a processor-based system (FIG. 1, 102A-102M, 106A-106N; FIG. 4, 400; FIG. 8, 800) to perform operations. The operations comprise configuring (FIG. 2, 202) an artifact (FIG. 4, 442), which is built from source code (FIG. 4, 434), to define a type (FIG. 4, 450), which defines functionality of the artifact, and to further define a complex value-bearing language expression (FIG. 4, 452), which describes a configuration of the artifact or of a function of the artifact, such that the functionality and the configuration are defined in the source code, are written in a same computer language, and are included in a same software project. The operations further comprise extracting (FIG. 2, 204) a constant value (FIG. 4, 436) from the complex value-bearing language expression at build time of the artifact by evaluating a syntax of the complex value-bearing language expression. The operations further comprise, during a build of the artifact, generating (FIG. 2, 206) metadata (FIG. 4, 438) that includes the constant value.

III. Example Computer System

Figure 9:
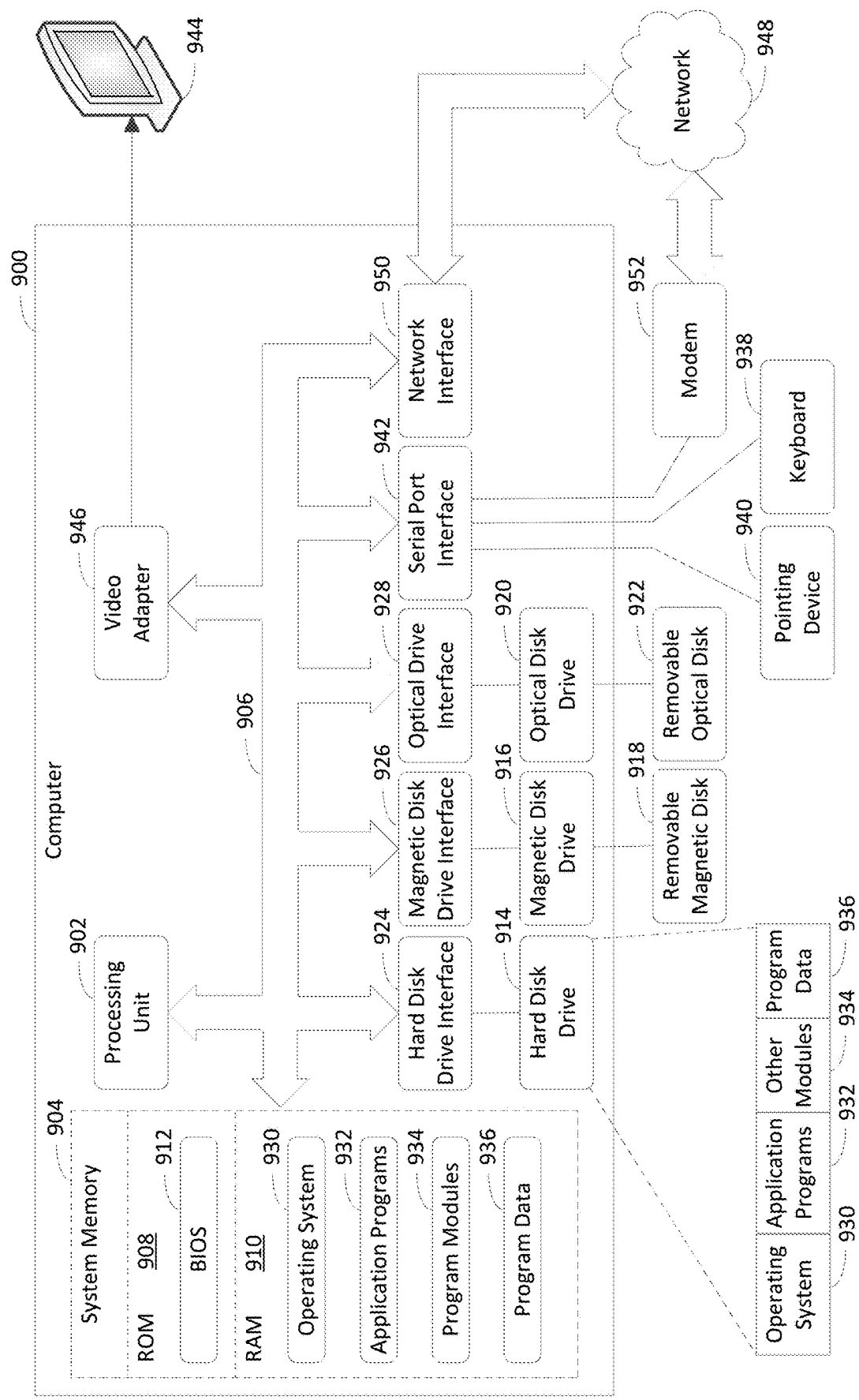
FIG. 9 depicts an example computer in which embodiments may be implemented.

FIG. 9 depicts an example computer 900 in which embodiments may be implemented. Any one or more of the user devices 102A-102M and/or any one or more of the servers 106A-106N shown in FIG. 1 and/or computing system 400 shown in FIG. 4 may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of (e.g., at least a portion of) the complex expression-based metadata generator 108, the complex expression-based metadata generator 408, the artifact configuration logic 412, the value extraction logic 414, the metadata generation logic 416, the distribution logic 418, the error identification logic 420, the notification logic 422, the syntax evaluation logic 424, the semantic evaluation logic 426, the information inclusion logic 428, the information validation logic 430, the correlation logic 432, flowchart 200 (including any step of flowchart 200), and/or flowchart 300 (including any step of flowchart 300), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   a processing system coupled to the memory, the processing system configured to:
   configure an artifact, which is built from source code, to define a type, which defines functionality of the artifact, and to further define a complex value-bearing language expression, which describes a configuration of a function of the artifact, such that the functionality and the configuration are defined in the source code, are written in a same computer language, and are included in a same software project;
   extract a constant value from the complex value-bearing language expression at build time of the artifact by evaluating a syntax of the complex value-bearing language expression; and
   during a build of the artifact, generate metadata that includes the constant value;

wherein the function is included in a first source code file of the same software project;
wherein the metadata is included in a second source code file of the same software project; and
wherein the second source code file is different from the first source code file.

2. The system of claim 1, wherein the complex value-bearing language expression is defined as part of the type, which defines the functionality of the artifact.

3. The system of claim 1, wherein the processing system is configured to:
extract the constant value from the complex value-bearing language expression at build time of the artifact by evaluating the syntax of the complex value-bearing language expression and semantics of the complex value-bearing language expression.

4. The system of claim 1, wherein the processing system is further configured to:
identify an error in the metadata; and
report the error to a developer of the source code while the developer is editing the complex value-bearing language expression.

5. The system of claim 1, wherein the processing system is further configured to:
provide a textual message to a developer of the source code, the textual message indicating that execution of the artifact necessitates implementation of the complex value-bearing language expression.

6. The system of claim 1, wherein the processing system is further configured to:
provide a textual message to a developer of the source code, the textual message indicating that the complex value-bearing language expression is to be evaluated at build time of the artifact.

7. The system of claim 1, wherein the processing system is configured to:
ensure that the metadata includes requisite information; and
ensure validity of the requisite information.

8. The system of claim 7, wherein the processing system is configured to:
ensure that the metadata includes the requisite information by causing a base type or an interface implemented by the type, which defines the functionality of the artifact, to require implementation of a requisite configuration, which is described by a complex value-bearing language expression of a specific data type, by leveraging a type system of the same computer language.

9. The system of claim 8, wherein the processing system is configured to:
cause the specific data type of the complex value-bearing language expression to ensure the validity of the requisite information by leveraging the type system of the same computer language.

10. The system of claim 7, wherein the processing system is configured to:
determine that the requisite information includes invalid information;
notify a developer of the source code about the invalid information;
receive valid information from the developer in response to the developer being notified about the invalid information; and
replace the invalid information with the valid information in the metadata.

11. The system of claim 1, wherein the complex value-bearing language expression references the type, which defines the functionality of the artifact; or
wherein the type, which defines functionality of the artifact, references the complex value-bearing language expression.

12. A method implemented by a computing system, the method comprising:
configuring an artifact, which is built from source code, to define a type, which defines functionality of the artifact, and to further define a complex value-bearing language expression, which describes a configuration of the artifact or of a function of the artifact, such that the functionality and the configuration are defined in the source code, are written in a same computer language, and are included in a same software project;
extracting a constant value from the complex value-bearing language expression at build time of the artifact by evaluating a syntax of the complex value-bearing language expression;
defining a second type, which defines additional functionality of the artifact, and a configuration of the additional functionality using a second complex value-bearing language expression such that the additional functionality and the configuration of the additional functionality are defined in the source code from which the artifact is built, are written in the same computer language, and are included in the same software project;
extracting a second constant value from the second complex value-bearing language expression at build time of the artifact by evaluating a syntax of the second complex value-bearing language expression; and
during a build of the artifact, generating metadata that includes the constant value and second metadata that includes the second constant value.

13. The method of claim 12, wherein the metadata describes a manner in which the artifact is to be loaded.

14. The method of claim 12, wherein the metadata indicates an operation that is to trigger loading of the artifact.

15. The method of claim 12, wherein the metadata describes a configuration of a resource on which the artifact depends.

16. The method of claim 12, further comprising:
correlating the constant value that is extracted from the complex value-bearing language expression and the second constant value that is extracted from the second complex value-bearing language expression.

17. The method of claim 12, wherein the complex value-bearing language expression references the second complex value-bearing language expression.

18. The method of claim 13, wherein the second complex value-bearing language expression references the complex value-bearing language expression.

19. A computer program product comprising a computer-readable storage medium having instructions recorded thereon for enabling a processor-based system to perform operations, the operations comprising:
configuring an artifact, which is built from source code, to define a type, which defines functionality of the artifact, and to further define a complex value-bearing language expression, which describes a configuration of the artifact or of a function of the artifact, such that the functionality and the configuration are defined in the source code, are written in a same computer language, and are included in a same software project;

extracting a constant value from the complex value-bearing language expression at build time of the artifact by evaluating a syntax of the complex value-bearing language expression;

during a build of the artifact, generating metadata that includes the constant value;

identifying an error in the metadata; and reporting the error to a developer of the source code while the developer is editing the complex value-bearing language expression.

20. The computer program product of claim 19, wherein the metadata describes cloud infrastructure that enables the artifact to run.

21. The computer program product of claim 19, wherein the functionality indicates which code is executed when the type is executed.

* * * * *